United States Patent
Wurtemberger

(10) Patent No.: US 7,735,902 B2
(45) Date of Patent: Jun. 15, 2010

(54) FRONT STRUCTURE OF A MOTOR VEHICLE

(75) Inventor: Ralf Wurtemberger, Flein (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/469,172

(22) Filed: May 20, 2009

(65) Prior Publication Data

US 2010/0052342 A1 Mar. 4, 2010

(30) Foreign Application Priority Data

Aug. 27, 2008 (DE) .................. 10 2008 039 972

(51) Int. Cl.
*B60R 19/26* (2006.01)
(52) U.S. Cl. .................. 296/187.09; 293/132; 293/133
(58) Field of Classification Search .................. 293/132, 293/133, 102, 120, 134, 135, 136, 137; 296/187.09
See application file for complete search history.

(56) References Cited

U.S. PATENT DOCUMENTS

| | | | |
|---|---|---|---|
| 6,398,275 B1 * | 6/2002 | Hartel et al. ............. | 293/102 |
| 6,447,049 B1 * | 9/2002 | Tohda et al. ............. | 296/180.1 |
| 6,474,708 B1 | 11/2002 | Gehringhoff et al. | |
| 6,676,179 B2 | 1/2004 | Sato et al. | |
| 2006/0214439 A1 * | 9/2006 | Reynolds .................... | 293/132 |

FOREIGN PATENT DOCUMENTS

EP  1 451 041 B1  9/2004

* cited by examiner

*Primary Examiner*—Joseph D Pape
(74) *Attorney, Agent, or Firm*—Gerald E. Hespos; Michael J. Porco

(57) ABSTRACT

A front structure of a motor vehicle has a lower bumper that runs in the vehicle transverse direction, and an upper bumper arranged above the lower bumper. The lower bumper and upper bumper are supported on the vehicle structure via crash boxes. The lower bumper defines a closed hollow profile and is supported on a front-end body, in particular on a luggage compartment depression, of the motor vehicle via the associated crash boxes.

15 Claims, 1 Drawing Sheet

FRONT STRUCTURE OF A MOTOR VEHICLE

This application claims priority under 35 USC 119 to German Patent Application No. 10 2008 039 972.8 filed on Aug. 27, 2008, the entire disclosure of which is incorporated herein by reference.

BACKGROUND OF THE INVENTION

1. Field of the Invention

The invention relates to a front structure of a motor vehicle having a lower bumper that runs in the transverse direction of the vehicle and an upper bumper arranged above the lower bumper.

2. Description of the Related Art

EP 1 451 041 B1 discloses a generic front structure of a motor vehicle in which a foam layer with a front surface is provided on the front side of an upper bumper to limit the forces that act on the legs of a pedestrian in the event of a collision with the pedestrian. A lower bumper is at approximately the same level as or in front of the front surface of the upper bumper, and lateral ends of the two bumpers are fastened to longitudinal beams of the motor vehicle. Energy-absorbing crash boxes are arranged between the two bumpers and the longitudinal beams of the motor vehicle. The crash boxes extend further forward for the lower bumper than for the upper bumper. This design is intended to create an impact-friendly front structure so that only forces below a certain limit value are introduced into the legs of the pedestrian in the event of a collision with a pedestrian. Furthermore, the front structure should be able to absorb energy of a high-energy impact, such as an impact against another motor vehicle or against a fixed obstacle. Both of these demands should be met as far as possible without an increase in length of the motor vehicle.

Accordingly, an object of the invention is to provide a front structure for a motor vehicle that improves pedestrian protection and an energy absorption capability.

SUMMARY OF THE INVENTION

The invention relates to a front structure of a motor vehicle having upper and lower bumpers that extend in the transverse direction of the vehicle. Both bumpers are supported on the body of the motor vehicle, such as on the body or the body frame, by crash boxes, and preferably in each case by two crash boxes. In this context, "crash box" is a term of art in the bumper technology and refers to a generally polygonal or rounded tubular structure having a rear end with flanges that connect to the vehicle and a front end connected to the bumper. The lower bumper has a closed hollow profile. In this context, a closed hollow profile can be a tube formed by extrusion or other known tube forming techniques. The closed hollow profile also can be formed by two opposed channels welded or otherwise secured with their concave surfaces facing one another. Still further, the closed hollow profile can be formed by securing a plate to the concave side of a U-shaped channel. The closed hollow channel can be of uniform or non-uniform cross-section along its length from side-to-side on the motor vehicle. The cross-sectional shape at specific locations may be selected in accordance with other structures that may be connected to the lower bumper, as explained herein. Opposite ends of the lower bumper may be open or closed. The closed hollow profile of the lower bumper results in a considerably higher section modulus than an open hollow profile. The higher section modulus makes it possible to fasten further components, such as trim panel parts, to the lower bumper. Additionally, the hollow profile of the lower bumper provides improved pedestrian protection. At least the lower bumper may be supported on a luggage compartment depression of the motor vehicle.

At least two substantially vertical stiffening elements preferably extend between the upper and lower bumpers. The stiffening elements define connecting elements that permit an introduction of force from the one bumper into the other bumper in the event of an impact of the motor vehicle against an obstacle or in the event of an impact of a pedestrian against the motor vehicle, thereby providing an impact-energy-absorbing and pedestrian-impact-friendly solution. The two stiffening elements may define hollow profiles and may have their respective longitudinal ends be welded or otherwise connected to the upper and lower bumpers. For example, the stiffening elements may be produced from plastic and may be designed to be clipped to the upper or to the lower bumper so as to enable retroactive assembly. Depending on structural requirements, the stiffening elements may be oblique to the vertical, and can be arranged in an aerodynamically advantageous fashion.

An energy absorbing impact element, such as a foam, preferably is clipped at least to the upper bumper. The clip connection enables the impact element to be fastened to the upper bumper quickly by hand and in an extremely simple manner. Thus, it is possible to avoid a complex and expensive assembly step during the production of the motor vehicle.

The lower bumper preferably is embodied as the carrier of a trim panel. Additionally, the closed hollow profile of the lower bumper provides a higher section modulus, and hence enables the lower bumper to be used simultaneously as a carrier for further components. Such components in a front region of a motor vehicle may, for example, be a trim panel, a front apron and/or a spoiler. Conventional bumpers usually cannot perform such a carrier function, because conventional bumpers often do not have the stiffness required to be a carrier element. A further energy-absorbing impact element may be arranged between the lower bumper and the trim panel, and as a result the consequential injuries in the event of a pedestrian impact can be reduced further. The further impact element can be fastened to the lower bumper in a fashion similar to that used on the upper bumper, for example by means of clips.

One preferred embodiment of the invention is illustrated in the drawing and is explained in more detail in the following description. Further important features and advantages of the invention can be gathered from the drawing and from the associated description. The features mentioned above and the features explained below can be used not in the specified combination and also in other combinations or individually without departing from the scope of the invention.

DETAILED DESCRIPTION OF THE PREFERRED EMBODIMENT

Figure 1:
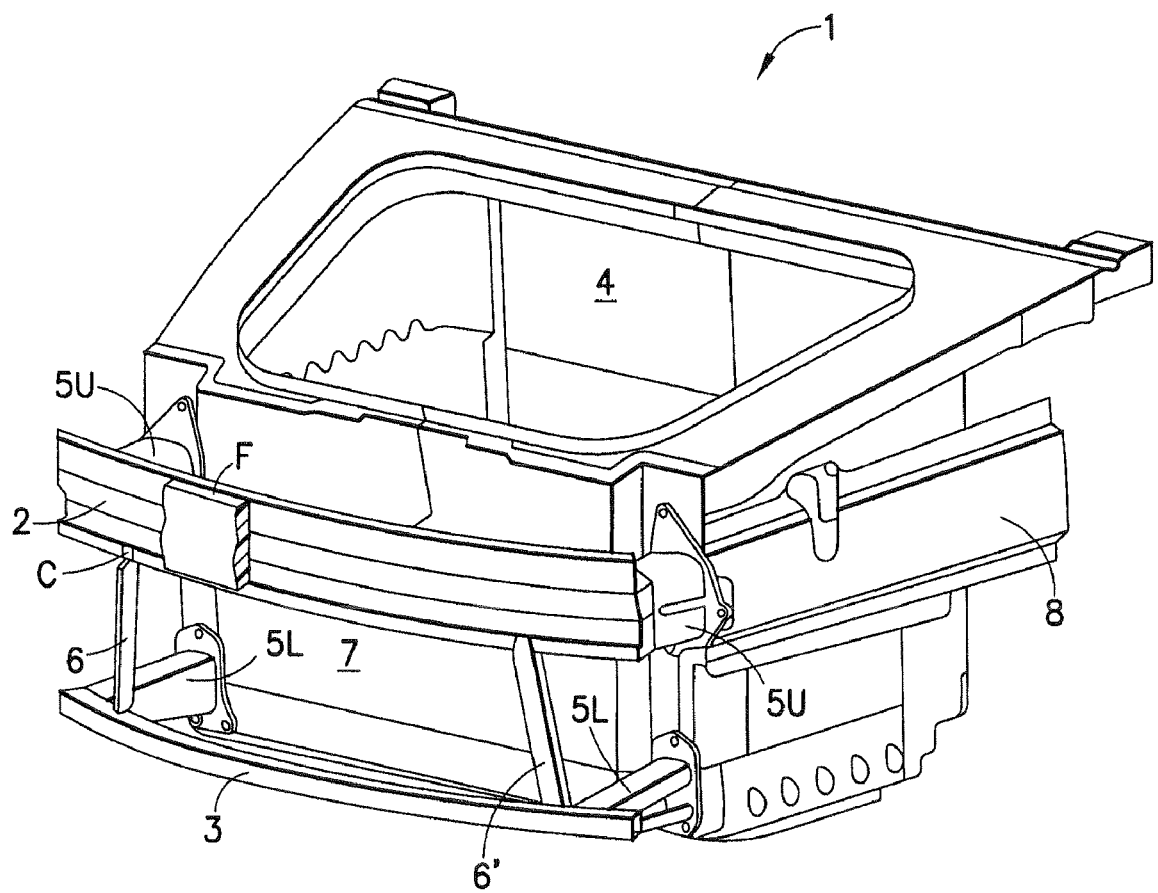
FIG. 1 is a perspective view of a front structure of a motor vehicle in accordance with the invention.
Figure 2:
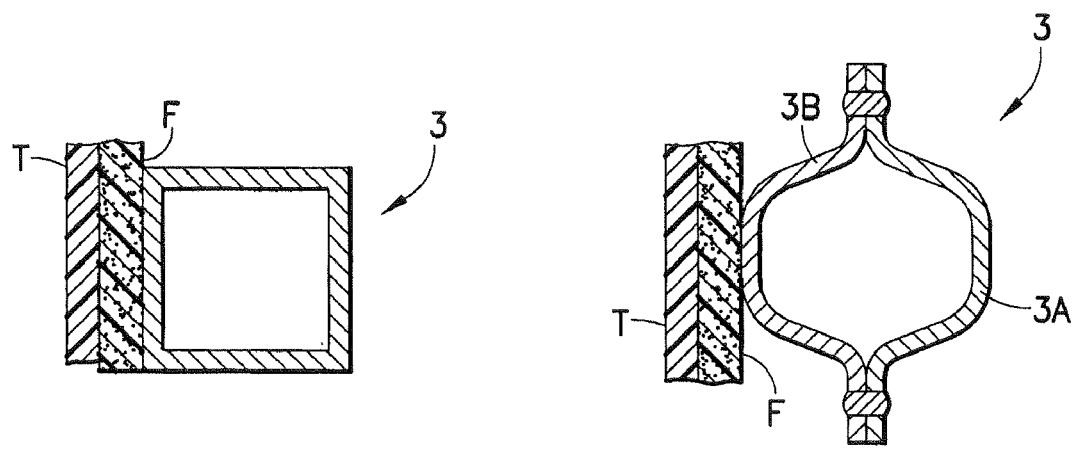
FIG. 2 is a cross-sectional view of the lower bumper taken along a vertical plane parallel to the longitudinal centerline of the motor vehicle.
Figure 3:
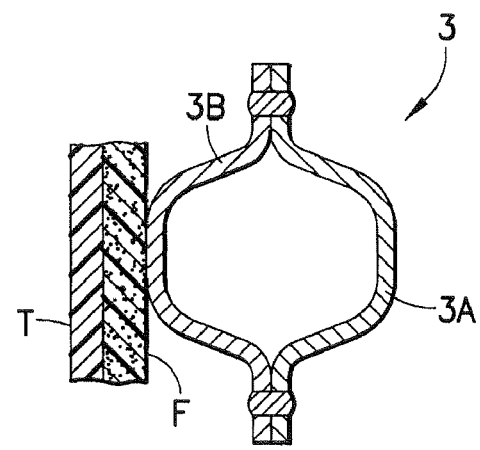
FIG. 3 is a cross-sectional view similar to FIG. 2, but showing an alternate lower bumper.

The front structure of a motor vehicle according to the invention is identified by the numeral 1 in FIG. 1. The front structure 1 has an upper bumper 2 and a lower bumper 3 that run in the vehicle transverse direction at a position in front of a luggage compartment depression 4 of the motor vehicle as viewed in the direction of travel. Opposite lateral ends of the upper bumper 2 are connected to a front-end body by two upper crash boxes 5U and opposite lateral ends of the lower bumper 3 are connected to the front-end body by two lower crash boxes 5L. The crash boxes 5L and 5U enable an energy-absorbing deformation in the event of an impact of the motor vehicle against an obstacle or in the event of an impact of a pedestrian against the motor vehicle. The lower bumper 3 defines a closed hollow profile. Thus, the lower bumper 3 may define a hollow extruded tube, of preferably polygonal cross-section as shown in FIG. 2. Alternatively, the lower bumper 3 may be formed from two U-shaped channels 3A and 3B disposed with their concave surfaces facing one another and with their flanges welded or otherwise secured, as shown in FIG. 3. Accordingly, the lower bumper 3 has a relatively high section modulus. The high section modulus enables a high absorption of energy during deformation and also allows the lower bumper 3 to be used as a carrier element for further elements (not shown), such as a trim panel, a front apron, a spoiler or other elements.

Two substantially vertical stiffening elements 6 and 6' are provided between the two bumpers 2 and 3. The stiffening elements 6 and 6' transmit force between the lower and upper bumpers 3 and 2 in a crash. The lower bumper 3 performs a function of providing leg support to reduce the severity of consequences of an accident for a pedestrian who collides with the motor vehicle.

The two stiffening elements 6 and 6' are connected fixedly at their respective upper and lower longitudinal ends to the upper and lower bumpers 2 and 3, preferably by screws or welding. The two stiffening elements 6, 6' also could be inserted or mounted after the upper and lower bumpers 2 and 3 are mounted on the body. With this option, a clip connection C could be used between the stiffening elements 6 and 6' and the associated bumpers 2 and 3 to reduce the assembly expenditure.

The two stiffening elements 6, 6' are arranged aerodynamically, so that air resistance of the motor vehicle is not adversely affected by the stiffening elements 6, 6'. An energy absorbing impact element (not shown) also may be clipped or otherwised arranged on the upper bumper 2 and/or the lower bumper 3 for further reducing the consequences of a pedestrian impact. An impact element of this type may be a foam F that easily can be deformed plastically. This impact element F may fill an intermediate space between the lower bumper 3 and a trim panel T, such as a front apron, carried by the lower bumper 3, thereby stiffening the trim panel element T.

FIG. 1 shows that the crash boxes 5U, 5L are arranged on a plate 7 that extends in the vehicle transverse direction, so that both the upper and lower bumpers 2 and 3 are connected to the motor vehicle body by the plate 7. The upper bumper 2 also is connected to vehicle longitudinal beams 8 at laterally spaced positions on the vehicle. The transverse plate 7 may be formed from sheet metal and preferably forms a wall of the front-end luggage compartment 4.

The front structure 1 creates a particularly effective introduction of force that is favorable for a pedestrian impact and reduces the severity of the consequences of a pedestrian impact for the pedestrian. Additionally, the closed hollow profile for the lower bumper 3 facilitates fastening components, such as trim panel elements, to the lower bumper 3. The stiffening elements 6 and 6' also connect the two bumpers 2 and 3 to one another in a force-transmitting fashion, thereby creating a second load plane. Furthermore, the hollow profile for the lower bumper 3 enables the lower bumper 3 to carry a trim panel or further components so that the functionality of the lower bumper 3 is enhanced.

What is claimed is:

1. A front structure of a motor vehicle, the motor vehicle having left and right vehicle longitudinal beams extending in a vehicle longitudinal direction on opposite transverse sides of the motor vehicle, the front structure of the motor vehicle comprising: a plate extending in a vehicle transverse direction, a lower bumper that runs in the vehicle transverse direction at a position forward of the plate and an upper bumper arranged above said lower bumper, left and right ends of the lower bumper being supported on the plate by left and right lower crash boxes and left and right ends of the upper bumper being supported on the plate and the vehicle longitudinal beams by left and right upper crash boxes, the lower bumper defining a closed hollow profile and at least two substantially vertically running stiffening elements extending between the upper and lower bumpers, the stiffening elements each defining a hollow profile.

2. The front structure of claim 1, further comprising an energy-absorbing impact element clipped at least to the upper bumper.

3. The front structure of claim 1, wherein the lower bumper is embodied as the carrier of a trim panel.

4. The front structure of claim 3, further comprising an energy absorbing impact element arranged between the trim panel and the lower bumper.

5. The front structure of claim 1, wherein the plate forms a wall of a front luggage compartment depression of the motor vehicle.

6. The front structure of claim 1, wherein opposite ends of the upper bumper in the vehicle transverse direction are arranged on the vehicle longitudinal beams via the plate.

7. A front structure of a motor vehicle, comprising an elongate upper bumper extending in a transverse direction of the vehicle and having opposite left and right ends, transversely spaced left and right upper crash boxes extending rearwardly from the respective left and right ends of the upper bumper to a front-end body of the vehicle for supporting the upper bumper on the vehicle, a lower bumper disposed below the upper bumper and extending in the transverse direction of the vehicle, the lower bumper defining a closed hollow profile and having opposite left and right ends, transversely spaced left and right lower crash boxes extending rearwardly from the respective left and right ends of the lower bumper to a front-end body of the vehicle for supporting the lower bumper on the vehicle, stiffening elements defining closed hollow profiles and extending substantially vertically between the upper and the lower bumpers for permitting a transmission of forces between the upper and lower bumpers.

8. The front structure of claim 7, further comprising an upper energy-absorbing impact foam clipped at least to the upper bumper.

9. The front structure of claim 8, further comprising a trim panel clipped to the lower bumper.

10. The front structure of claim 9, further comprising a lower energy absorbing impact foam between the trim panel and the lower bumper.

11. A motor vehicle comprising: left and right longitudinal beams extending in a longitudinal direction of the vehicle on opposite left and right sides of the vehicle, a plate extending in a vehicle transverse direction between the longitudinal beams in proximity to a front end of the vehicle, left and right upper crash boxes projecting forward from respective left and right positions on an upper part of the plate and aligned respectively with the left and right longitudinal beams, left and right lower crash boxes projecting forward from respective left and right positions on a lower part of the plate, an upper bumper extending in the vehicle transverse direction and being supported at front ends of the upper crash boxes, and a lower bumper extending in the vehicle transverse direction at a position below the upper bumper, the lower bumper defining a closed hollow profile and being supported at front ends of the lower crash boxes.

12. The motor vehicle of claim 11, further comprising stiffening elements extending substantially vertically between the upper and the lower bumpers for permitting a transmission of forces between the upper and lower bumpers.

13. The motor vehicle of claim 12, further comprising an upper energy-absorbing impact foam clipped at least to the upper bumper.

14. The motor vehicle of claim 13, further comprising a trim panel clipped to the lower bumper.

15. The motor vehicle of claim 14, further comprising a lower energy absorbing impact foam between the trim panel and the lower bumper.

* * * * *